United States Patent
Hoad et al.

(10) Patent No.: US 12,372,950 B2
(45) Date of Patent: Jul. 29, 2025

(54) REDUCING IMPACT OF DISPATCHER INITIALIZATION ON DISPATCHING SYSTEM PERFORMANCE

(71) Applicant: Applied Materials, Inc., Santa Clara, CA (US)

(72) Inventors: Paul D. Hoad, Hampshire (GB); Shankar Chinnusamy, Chennai (IN); Prasath Palaniappan, Chennai (IN); Jayapradeep Mohan, Chennai (IN)

(73) Assignee: Applied Materials, Inc., Santa Clara, CA (US)

( * ) Notice: Subject to any disclaimer, the term of this patent is extended or adjusted under 35 U.S.C. 154(b) by 81 days.

(21) Appl. No.: 18/222,089

(22) Filed: Jul. 14, 2023

(65) Prior Publication Data

US 2025/0021082 A1 Jan. 16, 2025

(51) Int. Cl.
 *G05B 19/418* (2006.01)
(52) U.S. Cl.
 CPC .............. *G05B 19/41865* (2013.01)
(58) Field of Classification Search
 None
 See application file for complete search history.

(56) References Cited

U.S. PATENT DOCUMENTS

| | | | | |
|---|---|---|---|---|
| 7,356,378 B1 * | 4/2008 | Huang | ................ | G06Q 10/047 700/228 |
| 8,606,957 B2 * | 12/2013 | Albig | ..................... | H04L 67/06 709/232 |
| 8,745,706 B2 * | 6/2014 | Potiagalov | .............. | H04L 69/08 726/5 |
| 8,869,370 B2 * | 10/2014 | Kilibarda | .............. | B23P 19/001 29/430 |
| 9,125,049 B2 * | 9/2015 | Huang | ................... | H04N 7/181 |
| 9,665,668 B2 | 5/2017 | Norman | | |
| 9,890,971 B2 * | 2/2018 | Ribbich | ................... | F24F 11/62 |

(Continued)

FOREIGN PATENT DOCUMENTS

| | | | | |
|---|---|---|---|---|
| EP | 1089147 A2 * | 4/2001 | ........... | G05B 19/042 |
| EP | 2618266 A1 * | 7/2013 | ............ | G06F 15/16 |

(Continued)

OTHER PUBLICATIONS

Real-time dispatching and reporting for semiconductor manufacturing Applied SmartFactory, https://appliedsmartfactory.com/semiconductor/supply-chain-solutions/rtd/, [downlowded from the internet on: Jun. 13, 2023], 5 pages.

(Continued)

*Primary Examiner* — Jason Lin
(74) *Attorney, Agent, or Firm* — Lowenstein Sandler LLP

(57) ABSTRACT

A method of operating a set of dispatchers for a manufacturing facility, wherein each dispatcher of the set of dispatchers is a software application that makes dispatch decisions for the manufacturing facility based on facility data related to the manufacturing facility, includes identifying a first dispatcher of the set of dispatchers, wherein the first dispatcher is a non-initialized dispatcher, selecting, as an initialization partner, a second dispatcher of the set of dispatchers, and causing the first dispatcher to initiate a data retrieval process with the second dispatcher to retrieve, from the second dispatcher, an initial set of facility data related to the manufacturing facility.

18 Claims, 6 Drawing Sheets

(56) References Cited

U.S. PATENT DOCUMENTS

| | | | | |
|---|---|---|---|---|
| 10,318,266 | B2* | 6/2019 | Ribbich | G06F 8/65 |
| 10,360,188 | B2* | 7/2019 | Hanson | G06F 16/2365 |
| 10,458,669 | B2* | 10/2019 | Ribbich | F24F 11/89 |
| 10,712,038 | B2* | 7/2020 | Ribbich | F24F 11/0001 |
| 10,802,506 | B2* | 10/2020 | Soder | G05D 1/0297 |
| 10,941,951 | B2* | 3/2021 | Hern | F24F 1/08 |
| 11,216,020 | B2* | 1/2022 | Sinha | G05D 23/1917 |
| 11,277,893 | B2* | 3/2022 | Sinha | H05B 45/12 |
| 2004/0039469 | A1 | 2/2004 | Lin | |
| 2005/0187649 | A1 | 8/2005 | Funk et al. | |
| 2006/0285507 | A1* | 12/2006 | Kinder | H04W 48/12 |
| | | | | 370/310 |
| 2007/0244848 | A1* | 10/2007 | Chu | G06Q 10/06 |
| 2009/0127328 | A1* | 5/2009 | Aissa | G10L 17/00 |
| | | | | 235/377 |
| 2009/0157868 | A1* | 6/2009 | Chaudhry | H04N 21/254 |
| | | | | 709/224 |
| 2011/0113234 | A1* | 5/2011 | Augenstein | G06F 3/0605 |
| | | | | 707/827 |
| 2017/0302456 | A1* | 10/2017 | Visoky | G05B 19/4185 |
| 2021/0263505 | A1 | 8/2021 | Zheng et al. | |

FOREIGN PATENT DOCUMENTS

| | | |
|---|---|---|
| EP | 3598713 A1 | 1/2020 |
| KR | 20130141743 A | 12/2013 |

OTHER PUBLICATIONS

International Search Report and Written Opinion for International Application No. PCT/US2024/036211, mailed Sep. 30, 2024, 08 pages.

* cited by examiner

REDUCING IMPACT OF DISPATCHER INITIALIZATION ON DISPATCHING SYSTEM PERFORMANCE

TECHNICAL FIELD

The present disclosure relates to semiconductor device fabrication, and, more particularly, to reducing impact of dispatcher initialization on dispatching system performance.

BACKGROUND

Products can be produced by performing one or more manufacturing processes using manufacturing equipment. For example, semiconductor manufacturing equipment can be used to produce semiconductor devices (e.g., substrates) via semiconductor manufacturing processes. The manufacturing equipment can, according to a process recipe and via a substrate processing tool, deposit multiple layers of film on the surface of the substrate and can perform an etch process to form the intricate pattern in the deposited film. Sensors can be used to determine manufacturing parameters of the manufacturing equipment during the manufacturing processes and metrology equipment can be used to determine property data of the products that were produced by the manufacturing equipment, such as the overall thickness of the layers on the substrate.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method of operating a set of dispatchers for a manufacturing facility is provided. Each dispatcher of the set of dispatchers is a software application that makes dispatch decisions for the manufacturing facility based on facility data related to the manufacturing facility. The method includes identifying a first dispatcher of the set of dispatchers, wherein the first dispatcher is a non-initialized dispatcher, selecting, as an initialization partner, a second dispatcher of the set of dispatchers, and causing the first dispatcher to initiate a data retrieval process with the second dispatcher to retrieve, from the second dispatcher, an initial set of facility data related to the manufacturing facility.

In another aspect of the disclosure, a system for operating a set of dispatchers for a manufacturing facility is provided. Each dispatcher of the set of dispatchers is a software application that makes dispatch decisions for the manufacturing facility based on facility data related to the manufacturing facility. The system includes a memory and a processing device, operatively coupled to the memory, to perform operations including identifying a first dispatcher of the set of dispatchers, wherein the first dispatcher is a non-initialized dispatcher, selecting, as an initialization partner, a second dispatcher of the set of dispatchers, and causing the first dispatcher to initiate a data retrieval process with the second dispatcher to retrieve, from the second dispatcher, an initial set of facility data related to the manufacturing facility.

A further aspect of the disclosure includes a non-transitory computer-readable storage medium is provided. The non-transitory computer-readable storage medium includes instructions that, when executed by a processing device operatively coupled to a memory, performs operations for operating a set of dispatchers for a manufacturing facility. Each dispatcher of the set of dispatchers is a software application that makes dispatch decisions for the manufacturing facility based on facility data related to the manufacturing facility. The operations include identifying a first dispatcher of the set of dispatchers, wherein the first dispatcher is a non-initialized dispatcher, selecting, as an initialization partner, a second dispatcher of the set of dispatchers, and causing the first dispatcher to initiate a data retrieval process with the second dispatcher to retrieve, from the second dispatcher, an initial set of facility data related to the manufacturing facility.

BRIEF DESCRIPTION OF THE DRAWINGS

The present disclosure is illustrated by way of example, and not by way of limitation in the figures of the accompanying drawings.

DETAILED DESCRIPTION

Figure 1:
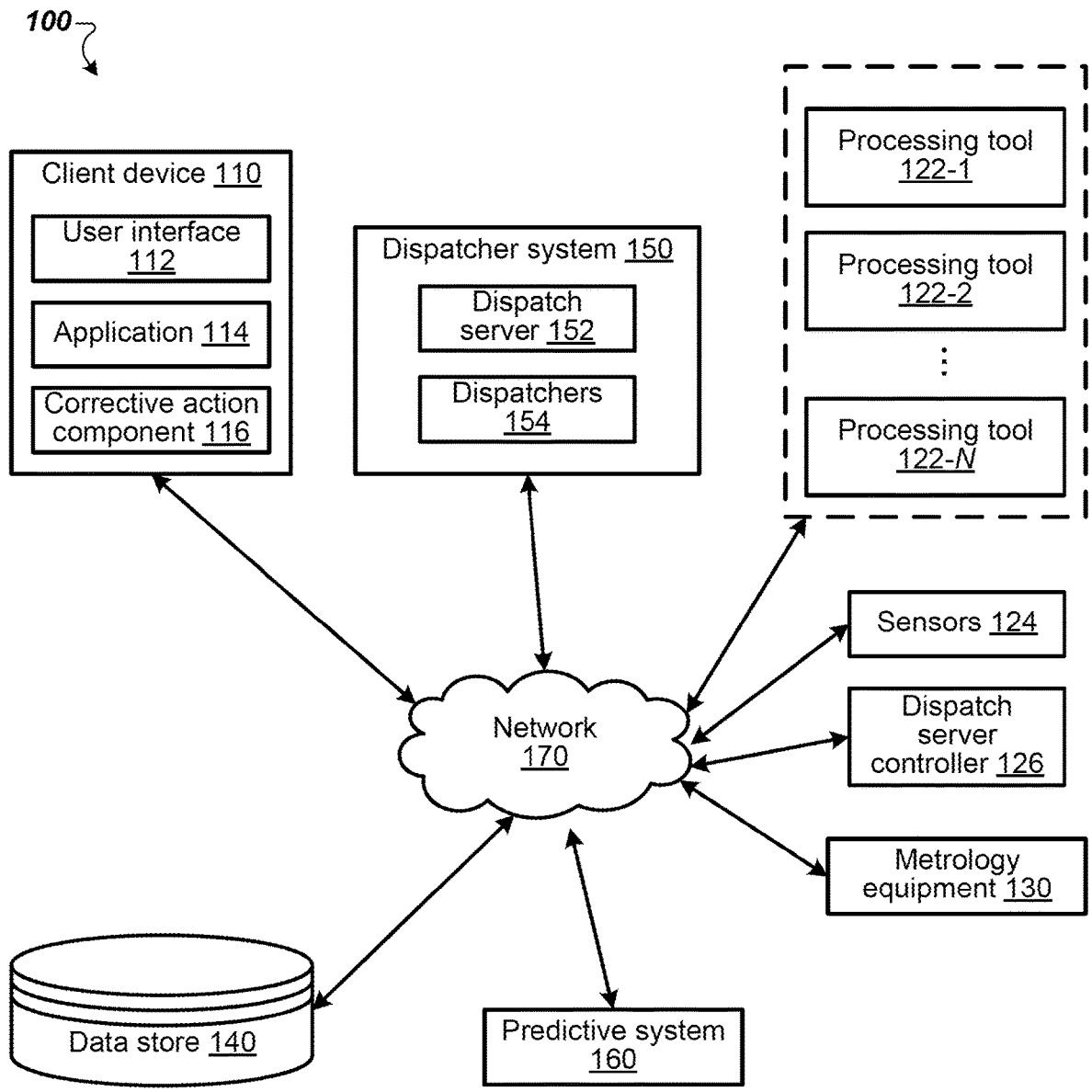
FIG. 1 is a block diagram of an example computing system, in accordance with some implementations of the present disclosure.

Described herein are technologies directed to reducing impact of dispatcher initialization on dispatching system performance. A dispatching system of a manufacturing facility can be used to make dispatch decisions that control operation of processing tools of the manufacturing facility. In some implementations, a manufacturing facility include an electronic device manufacturing system. An electronic device manufacturing system can include an electronic device processing system including multiple substrate processing tools, such as processing chambers. A processing chamber can have multiple sub-systems operating during each substrate manufacturing process (e.g., the deposition process, the etch process, the polishing process, etc.). A sub-system can be characterized as a set of sensors and controls related with an operational parameter of the processing chamber. An operational parameter can be a temperature, a flow rate, a pressure, and so forth. In an example, a pressure sub-system can be characterized by one or more sensors measuring the gas flow, the chamber pressure, the control valve angle, the foreline (vacuum line between pumps) pressure, the pump speed, and so forth. Accordingly, the processing chamber can include a pressure sub-system, a flow sub-system, a temperature subsystem, and so forth. A processing chamber can perform a manufacturing process according to a process recipe. A process recipe defines a particular set of operations to be performed for the substrate during the process and can include one or more settings associated with each operation. A process recipe can be embodied as a table of recipe settings including a set of inputs or recipe parameters ("parameters") and processes that are manually entered by a user (e.g., process engineer) to achieve a set of target properties (e.g., on-substrate characteristics), also referred to as a set of goals. For example, a deposition process recipe can include a temperature setting for the processing chamber, a pressure setting for the processing chamber, a flow rate setting for a precursor for a material included in the film deposited on the substrate surface, etc. Accordingly, the thickness of each film layer, the depth of each etch, and so forth, can be correlated to these processing chamber settings.

A dispatching system can make dispatch decisions to improve manufacturing productivity. For example, a dispatching system for an electronic device manufacturing system can be used to make dispatch decisions to improve manufacturing productivity across multiple substrate processing tools of the electronic device processing system. In some implementations, the dispatching system is a real-time dispatching (RTD) system that makes dispatch decisions in real-time or near real-time. Dispatching systems can enable electronic device manufacturers to develop dispatching policies to optimally fabricate various electronic devices with minimal performance bottleneck across the substrate processing tools.

For example, a dispatching system can include a manufacturing execution system (MES) communicably coupled to a set of substrate processing tools. The MES can gather raw facility data from various components of the manufacturing facility, such as a set of processing tools. The dispatching system can further include an MES database that can store raw facility data. In some implementations, the MES database is a relational database.

The dispatching system can further include a data processing component to process the raw facility data to generate processed facility data, also referred to as facility data. The dispatching system can further include a repository that can store the facility data. In some implementations, the repository is a temporal repository.

The facility data can be used by the dispatching system to coordinate and optimize electronic device processing tasks to meet production goals. For example, the facility data can be used to track individuals lots and substrates (e.g., wafers) throughout electronic device fabrication, manage process recipes used by substrate processing tools to fabricate electronic devices, monitor the status of the substrate processing tools, perform yield management to improve overall yield of the electronic device processing system, etc.

More specifically, the dispatching system can further include a set of dispatchers. A dispatcher is a software application that manages the scheduling and execution of tasks performed by processing tools in a manufacturing facility. For example, a task can be a substrate process performed by a substrate processing tool of an electronic device manufacturing system. In a manufacturing facility, there can be multiple processing tools and multiple lots that may need to be processed at the same time. Thus, the set of dispatchers can include multiple dispatchers in order to concurrently handle multiple dispatching requests received at approximately the same time.

For example, a dispatcher can optimize resource utilization, prioritize tasks, determine tasks execution order to maximize throughput, distribute workload across processing tools to optimize efficiency (e.g., load balancing), monitor a state of the electronic device processing system, etc. In particular, a dispatcher can make dispatch decisions regarding task scheduling and execution to optimize task execution (e.g., improve throughput). A dispatch decision defines an action that should happen next in the manufacturing facility. For example, a dispatch decision can select a processing tool into which a substrate should be placed for processing. Examples of dispatch decisions that can be performed in an electronic device processing system can include "where a wafer lot should be processed next," "which wafer lot should be picked for an idle substrate processing tool," etc. The state of an electronic device processing system can include status of the substrate processing tools, status of the electronic devices (e.g., locations and/or processing states of substrates), status of processing tasks being performed by the substrate processing tools, etc.

To make dispatch decisions, a dispatcher can utilize an in-memory rule execution engine that processes a set of dispatch rules based on dispatch decision data. For example, dispatch decision data can include facility data related to the manufacturing facility, such as an electronic device manufacturing system. Dispatch decision data can include data reflecting a state of the electronic device manufacturing system and/or factors that can affect dispatching (e.g., task scheduling and execution among the substrate processing tools). Examples of dispatch decision data can include, for example, lot information, substrate processing tool information (e.g., substrate processing tool capability and/or availability), route information, process recipe information, production goals, etc. Examples of dispatch rules can include, and are not limited to, select the highest priority wafer lot to work on next, select a wafer lot that uses the same set up which the tool is currently configured for, package items when a purchase order is complete, ship items when packaging is complete, etc. For example, the dispatch decision to be made may be "where a wafer lot should be processed next," and the dispatch rule that may be used to make the decision may be to "select the highest priority wafer lot to work on next and select a wafer lot that uses the same set up which the substrate processing tool is currently configured for."

It may be the case that a dispatcher has shut down and needs to be restarted. When a dispatcher shuts down, the dispatcher can lose the dispatch decision data stored in-memory. Thus, the dispatcher may need to be initialized ("primed") as part of the restart process to enable the dispatcher to make dispatch decisions. Initializing the dispatcher can include retrieving an initial set of dispatch decision data that is stored in-memory. For example, the initial set of dispatch decision data can include an initial set of facility data. The initial set of dispatch decision data can define a state of the manufacturing facility and/or factors. A similar process can be performed when a new dispatcher is being added to the dispatching system.

In some dispatching systems, a dispatcher is initialized by retrieving the initial set of dispatch decision data directly from the repository. However, retrieving the initial set of dispatch decision data from the repository can place a load on the repository. The load placed on the repository can cause performance bottlenecks and/or can prevent updates to facility data stored in the repository (e.g., real-time or near real-time updates to data). This, in turn, can prevent other dispatchers of the dispatching system from being able to make dispatch decisions in real-time or near real-time. Accordingly, initializing a dispatcher by retrieving an initial set of dispatch decision data from a repository can negatively impact the ability of a dispatching system to make accurate dispatch decisions within an electronic device manufacturing system.

Aspects and implementations of the present disclosure address these and other shortcomings of the existing technology by reducing impact of dispatcher initialization on dispatching system performance. A dispatching system described herein can include a dispatch server that can manage dispatcher initialization. In particular, the dispatch server can enable a non-initialized dispatcher to be initialized by retrieving dispatch decision data from an initialized dispatcher, referred to as an initialization partner. For example, a non-initialized dispatcher can be a new dispatcher or a dispatcher that has been restarted. By initializing or priming a non-initialized dispatcher from an initialization partner, instead of from the repository, implementations described herein can reduce load placed on the repository without needing to isolate the dispatch system and/or interfere with repository data updates. Further details regarding the dispatching system will be described below with reference to FIGS. 1-6.

Aspects of the present disclosure result in technological advantages. For example, implementations described herein can reduce overhead on the repository of a dispatching system, which can reduce the impact of dispatcher initialization on dispatching system performance and improve computational resource consumption.

FIG. 1 depicts an illustrative computer system ("system") 100, according to aspects of the present disclosure. In some implementations, system 100 can be included as part of an electronic device manufacturing system for manufacturing electronic devices (e.g., processing substrates). System 100 includes a client device 110, substrate processing tools 122-1 through 122-N, set of sensors 124, dispatch server controller 126, metrology equipment 130, data store 140, dispatching system 150 and predictive system 160. Client device 110, processing system 210, metrology equipment 130, data store 140, dispatching system 150 and predictive system 160 can be communicably coupled to each other via network 170. In some implementations, network 170 is a public network. In some implementations, network 170 is a private network. Network 170 can include one or more wide area networks (WANs), local area networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof.

Processing tools 122-1 through 122-N can be used to fabricate or manufacture electronic devices. Each of processing tools 122-1 through 122-N can perform at least one substrate process for processing a substrate (e.g., a wafer) using a substrate processing tool. Examples of substrate processes include a deposition process to deposit one or more layers of film on a surface of the substrate, an etch process to form a pattern on the surface of the substrate, etc.

Each of processing tools 122-1 through 122-N can perform a substrate process according to a process recipe. A process recipe defines a particular set of operations to be performed for a substrate during the process and can include one or more settings associated with each operation. For example, a deposition process recipe can include a temperature setting for the processing chamber, a pressure setting for the processing chamber, a flow rate setting for a precursor for a material included in the film deposited on the substrate surface, etc. In some implementations, set of substrate processing tools 122 includes one or more processing chambers. For example, the one or more processing chambers can include at least one of: one or more deposition chambers, one or more etch chambers, one or more lithography chambers, etc.

Set of sensors 124 can be configured to obtain data associated with a substrate being processed by set of substrate processing tools 122. In some implementations, set of sensors 124 can be part of a sensor system that includes sensor server 140 and a sensor identifier reader (e.g., front opening unified pod (FOUP) radio frequency identification (RFID) reader). For example, a substrate processing tool can include one or more sensors configured to generate spectral or non-spectral data associated with a substrate before, during, and/or after a substrate process is performed for the substrate. In some implementations, spectral data generated by set of sensors 124 can indicate a concentration of one or more materials deposited on a surface of a substrate. Sensors that can generate spectral data can include reflectometry sensors, ellipsometry sensors, thermal spectra sensors, capacitive sensors, and so forth. Sensors that can generate non-spectral data can include temperature sensors, pressure sensors, flow rate sensors, voltage sensors, etc. For example, a sensor can be a temperature sensor, a pressure sensor, a chemical detection sensor, a chemical composition sensor, a gas flow sensor, a motion sensor, a position sensor, an optical sensor, or any and other type of sensors. At least one sensor of set of sensors 124 can include a light source to produce light (or any other electromagnetic radiation), direct it towards a target, such as a component of system 100 or a substrate, a film deposited on the substrate, etc., and detect light reflected from the target. A sensor of set of sensors 124 can be located inside of an electronic device processing system (e.g., within any of the chambers including the loading stations, on one or more robots, on a robot blade, between the chambers, and so one) and/or outside of an electronic device processing system (e.g., to test ambient temperature, pressure, gas concentration, etc.). Sensor data received over a period of time (e.g., corresponding to at least part of a recipe or run) can be referred to as trace data (e.g., historical trace data, current trace data, etc.) received from different sensors over time. Sensor data can include a value of one or more of temperature (e.g., heater temperature), spacing (SP), pressure, high frequency radio frequency (HFRF), voltage of electrostatic chuck (ESC), electrical current, material flow, power, voltage, etc. Sensor data can be associated with or indicative of manufacturing parameters such as hardware parameters, such as settings or components (e.g., size, type, etc.) the electronic device processing system, or process parameters of the electronic device processing system. The sensor data can be provided while at least one of processing tools 122-1 through 122-N is performing substrate processing (e.g., equipment readings when processing products).

In some implementations, the electronic device processing system can include a set of sub-systems to enable and/or control one or more substrate processing. For example, the set of sub-systems can include at least one of: a pressure sub-system, a flow sub-system, a temperature sub-system, etc. Each sub-system can include a set of components. A set of components can include at least one of: a pressure pump, a vacuum, a gas deliver line, a plasma etcher, actuators etc. In some implementations, operation of the set of sub-systems can be controlled based at least in part on sensor data.

In some implementations, metrology equipment 130 includes a metrology server (e.g., a metrology database, metrology folders, etc.) and a metrology identifier reader (e.g., FOUP RFID reader for metrology system). Metrology equipment 130 can generate metrology data associated with substrates that are processed by at least one processing tools 122-1 through 122-N. The metrology data can include a value of film property data (e.g., wafer spatial film properties), dimensions (e.g., thickness, height, etc.), dielectric constant, dopant concentration, density, defects, etc. In some implementations, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. Metrology data can be generated using, for example, reflectometry techniques, ellipsometry techniques, transmission electron microscope (TEM) techniques, etc. In some implementations, metrology equipment 130 is included in the electronic device processing system. For example, metrology equipment 130 can be operatively coupled to at least one processing tools 122-1 through 122-N to generate metrology data for a substrate before, during, and/or after a substrate process performed while the substrate remains in the processing chamber. In some instances, metrology equipment 130 can be referred to as in-situ metrology equipment. In another example, metrology equipment 130 can be coupled to another station of manufacturing equipment 124. For example, metrology equipment can be coupled to a transfer chamber, a load lock, a factory interface, etc.

Client device 110 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some implementations, the metrology data can be received from the client device 110. Client device 110 can display a graphical user interface (GUI), where the GUI enables the user to provide, as input, metrology measurement values for processed substrates. Client device 110 can include user interface (UI) 112, application 114, and corrective action component 116. In implementations, a "user" can be represented as a single individual. However, other implementations of the disclosure encompass a "user" being an entity controlled by a plurality of users and/or an automated source. For example, a set of individual users federated as a group of administrators can be considered a "user."

Application 114 can be a computer program configured to provide maintenance, services, analytics, and predictive technologies performed by one or more evaluation systems (e.g., machine-learning models, inference engines, heuristics models, algorithms, physics-based engine, etc.). One or more evaluation systems (e.g., a machine-learning model) can be generated by predictive system 160. UI 112 can receive user input (e.g., via a Graphical User Interface (GUI) displayed via client device 110) associated with application 114. In some implementations, user interface 112 can be presented via a web browser (not shown) and application 114 can be hosted on an application server (not shown). Alternatively, the client device 110 includes a local (mobile or desktop) application 114 that provides user interface 112. In some implementations, user interface 112 can communicate with the application 114 via network 130.

In some implementations, input data can be sent to or processed by application 114. Corrective action component 116 can be part of application 114 or a separate system (e.g., program, application, etc.). In some implementations, corrective action component 116 receives input data from at least one component of system 100, determines a corrective action based on the input data, and causes the corrective action to be performed. Corrective action component 116 can receive user input (e.g., via a Graphical User Interface (GUI) displayed via the client device 110) of an indication associated with substrate processing. For example, responsive to receiving an indication that sensor data satisfied a threshold criterion (e.g., exceeded or fell below a fault detection limit), correction action module 116 can perform one or more corrective action (e.g., increase power, decrease flowrate, etc.). The corrective actions can be stored in a fault pattern library in data store 140.

In some implementations, corrective action component 116 transmits the indication to predictive system 160 (or any other service provided by application 114), receives output (e.g., predictive data) from predictive system 160, determines a corrective action based on the output, and causes the corrective action to be implemented. In some implementations, corrective action component 116 receives an indication of a corrective action from predictive system 160 and causes the corrective action to be implemented. Each client device 110 can include an operating system that allows users to one or more of generate, view, or edit data (e.g., indication associated with manufacturing equipment 124, corrective actions associated with manufacturing equipment 124, etc.).

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). Data store 140 can store data associated with substrate processing during a substrate process. For example, data store 140 can store data collected by set of sensors 124 before, during, or after a substrate process. Data stored by data store 140 can include historical process data (e.g., process data generated for a prior substrate processed at the manufacturing system) and/or current process data (e.g., process data generated for a current substrate processed at the manufacturing system). Data store 140 can also store spectral data or non-spectral data associated with a portion of a substrate being processed.

Data store 140 can also store contextual data associated with one or more substrates processed at the manufacturing system. Contextual data can include a recipe name, recipe step number, preventive maintenance indicator, operator, etc. Contextual data can refer to historical contextual data (e.g., contextual data associated with a prior process performed for a prior substrate) and/or current process data (e.g., contextual data associated with current process or a future process to be performed for a prior substrate). The contextual data can further include identify sensors that are associated with a particular sub-system of a processing chamber.

Data store 140 can also store task data. Task data can include one or more sets of operations to be performed for the substrate during a deposition process and can include one or more settings associated with each operation. For example, task data for a deposition process can include a temperature setting for a processing chamber, a pressure setting for a processing chamber, a flow rate setting for a precursor for a material of a film deposited on a substrate, etc. In another example, task data can include controlling pressure at a defined pressure point for the flow value. Task data can refer to historical task data (e.g., task data associated with a prior process performed for a prior substrate) and/or current task data (e.g., task data associated with current process or a future process to be performed for a substrate).

In some implementations, data store 140 can store statistical data. Statistical data can include statistics representative of the raw facility data, e.g., mean data (average), range data, standard deviation data, maximum and minimum data, median data, mode data, etc. Mean data can include a measured averages of two or more values. For example, mean data can be used to determine the average heater temperature, the processing chamber pressure, the average flowrate of a gas, etc., during a step(s), a specific time duration, an entire process recipe, etc. Range data can include the middle observation in a set of data (e.g., a median temperature during a step). Range data can include the difference between a maximum value and a minimum value of a set of values (e.g., the range of the heater pressure during a process recipe). The standard deviation is measure of the amount of variation or dispersion of a set of values.

In some implementations, data store 140 can be configured to store data that is not accessible to a user of the manufacturing system. For example, process data, spectral data, contextual data, etc. obtained for a substrate being processed at the manufacturing system is not accessible to a user (e.g., an operator) of the manufacturing system. In some implementations, all data stored at data store 140 can be inaccessible by the user of the manufacturing system. In other or similar implementations, a portion of data stored at data store 140 can be inaccessible by the user while another portion of data stored at data store 140 can be accessible by the user. In some implementations, one or more portions of data stored at data store 140 can be encrypted using an encryption mechanism that is unknown to the user (e.g., data is encrypted using a private encryption key). In other or similar implementations, data store 140 can include multiple data stores where data that is inaccessible to the user is stored in one or more first data stores and data that is accessible to the user is stored in one or more second data stores.

In some implementations, data store 140 can be configured to store data associated with known fault patterns. A fault pattern can be a one or more values (e.g., a vector, a scalar, etc.) associated with one or more issues or failures associated with a processing chamber sub-system. In some implementations, a fault pattern can be associated with a corrective action. For example, a fault pattern can include parameter adjustment steps to correct the issue or failure indicated by the fault pattern. For example, the predictive system or the corrective action module can compare a determined fault pattern (determined from data obtained from of one or more sensors of a sensor cluster) to a library of known fault patterns to determine the type of failure experienced by a sub-system, the cause of the failure, the recommended corrective action to correct the fault, and so forth.

Data store 140 can be part of or operationally connected to sensor server 140. Sensor server 140 can include one or more physical machines (e.g., server machines, desktop computers, etc.) that each include one or more processing devices communicatively coupled to memory devices and input/output (I/O) devices. The processing devices can include a computer, microprocessor, logic device or other device or processor that is configured with hardware, firmware, and software to carry out some of the implementations described herein.

Dispatching system 150 can include dispatch server 152 and set of dispatchers 154. In some implementations, dispatching system is an RTD system that makes dispatch decisions in real-time or near real-time. Operation of dispatch server 152 can be controlled by dispatch server controller 126. Although shown as components of dispatching system 150, each of dispatch server 152 and each dispatcher of set of dispatchers 154 can be included in one or more other computing devices, such as a rackmount server, a router computer, a server computer, a personal computer, a mainframe computer, a laptop computer, a tablet computer, a desktop computer, a GPU, an ASIC, etc. Each component can execute instructions to perform any one or more of the methodologies and/or implementations described herein. The instructions can be stored on a computer readable storage medium, which can include the main memory, static memory, secondary storage and/or processing device (during execution of the instructions. Dispatch server 152 can maintain a record of which dispatchers of set of dispatchers 154 are currently initialized ("initialized dispatchers"). As will now be described below with reference to FIG. 2, dispatch server 152 can manage initialization of a dispatcher of set of dispatchers 154 that is not initialized ("non-initialized dispatcher") by initiating data retrieval from an initialized dispatcher instead of a repository.

Figure 2:
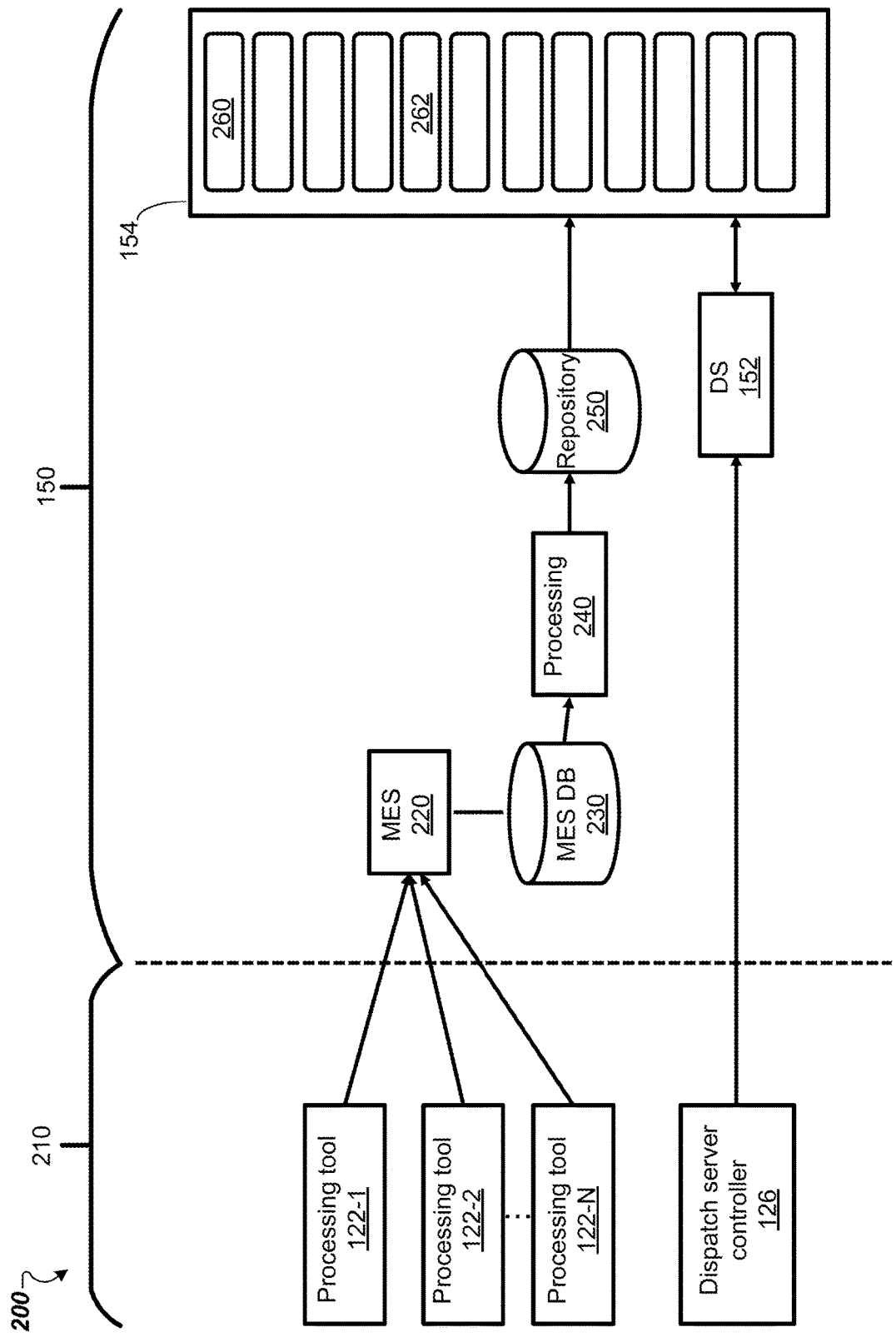
FIG. 2 is a diagram of an example system that can initialize dispatchers of a dispatching system of a manufacturing facility, in accordance with some implementations of the present disclosure.

FIG. 2 is a diagram of an example system 200 that can initialize dispatchers of a dispatching system of an electronic device manufacturing system, in accordance with some implementations of the present disclosure. As shown, system 200 includes electronic device processing system ("processing system") 210 and dispatching system 150, as described above with reference to FIG. 1. In some implementations, dispatching system 150 is a remote system. For example, dispatching system 150 can be a cloud-based system.

For example, processing system 210 can include substrate processing tools ("processing tools") 122-1 through 122-N and dispatcher server controller 126, as described above with reference to FIG. 1. Processing system 210 can include any suitable number of substrate processing tools in accordance with implementations described herein.

Dispatch system 150 can include dispatch server 152 and set of dispatchers 154, as described above with reference to FIG. 1. Additionally, dispatch system 150 can include MES 220, MES database (DB) 230, MES data processing component ("processing component") 240, and repository 250. MES 220 can generate raw MES data for storage in MES DB 230. Processing component 240 can process raw MES data to generate facility data for storage in repository 250. For example, processing raw MES data can include performing an extract, transform, load (ETL) process to extract raw MES data from MES DB 230, transform the raw MES data into transformed data, and load the transformed data into repository 250. The ETL process can be used to combine raw MES data obtained from multiple data sources into a single transformed dataset for storage in repository 250. Transforming raw MES data can include improving data quality by cleansing the raw MES data.

Dispatch system 150 can include dispatch server ("DS") 152 and set of dispatchers 154. Dispatch server 152 can manage initialization of non-initialized dispatchers of set of dispatchers 154. For example, a non-initialized dispatcher can be a new dispatcher included in set of dispatchers 154 that needs to be initialized (e.g., primed), or a dispatcher of set of dispatchers 154 that has been restarted and needs to be re-initialized (e.g., re-primed)

For example, upon identifying non-initialized dispatcher 260, DS 152 can select dispatcher 262 as an initialization partner for non-initialized dispatcher 260. An initialization partner for the non-initialized dispatcher can be selected using any suitable method. For example, DS 152 can select an idle dispatcher of the set of dispatchers as an initialization partner for the non-initialized dispatcher. If the set of dispatchers includes multiple idle dispatchers, then DS 152 can select an idle dispatcher that has been most recently updated (e.g., includes the most up-to-date dispatch decision data). Accordingly, initialized dispatcher 262 can be an idle dispatcher of set of dispatchers 154 that has been most recently updated.

DS 152 can cause non-initialized dispatcher 260 to be initialized using initialized dispatcher 262 as the initialization partner. More specifically, DS 152 can send, to non-initialized dispatcher 260, a notification that causes non-initialized dispatcher 260 to initiate data retrieval from initialized dispatcher 262. In some implementations, DS 152 sends the notification to non-initialized dispatcher 260 using an application programming interface (API) call. For example, the API call can be a representational state transfer (REST or RESTful) API call. The notification can include an identifier of initialized dispatcher 262 as the initialization partner. For example, the identifier of initialized dispatcher 262 can include an address of initialized dispatcher 262. In some implementations, the identifier of initialized dispatcher 262 includes a host name and a port number of initialized dispatcher 262. DS 152 can further cause initialized dispatcher 262 to halt all other dispatch activity until after initialization of non-initialized dispatcher 260 has been completed.

Upon receiving the notification from DS 152, non-initialized dispatcher 260 can initiate data retrieval to retrieve an initial set of dispatch decision data from initialized dispatcher 262 as the initialization partner. The initial set of dispatch decision data can include an initial set of facility data. Examples of dispatch decision data that can be included in an initial set of dispatch decision data retrieved from initialized dispatcher 262 include import files from import cache, subscribed repository table columns, cached reports (e.g., cached rules), managed cache data, unmanaged cache data, etc.

It may not be necessary for non-initialized dispatcher 260 to retrieve all dispatch decision data from initialized dispatcher 262 for initialization. For example, the initial set of dispatch decision data can include a set of base data that places non-initialized dispatcher 260 into a state that sufficiently minimizes the amount of dispatch decision data that needs to be transferred between repository 250 and dispatcher 260. The set of base data can be updated over time during normal operation of dispatcher 260 after initialization is complete.

In some implementations, retrieving the dispatch decision data from initialized dispatcher 262 includes determining whether a threshold condition related to the data retrieval has been satisfied, and terminating the data retrieval to obtain the set of base data in response to determining that the threshold condition has been satisfied.

For example, determining whether the threshold condition has been satisfied can include determining whether an amount of dispatch decision data retrieved from initialized dispatcher 262 is greater than or equal to a threshold amount of dispatch decision data. Illustratively, the threshold amount of dispatch decision data can be defined as a percentage of a total amount of dispatch decision data. As another example, determining whether the threshold condition has been satisfied can include determining whether an elapsed amount of time of data retrieval is greater than or equal to a threshold amount of time. The threshold amount of time can serve as a proxy for the threshold amount of dispatch decision data. Illustratively, the threshold amount of time can be defined as an average amount of time that is needed to obtain the threshold amount of dispatch decision data during the data retrieval process. In some implementations, the elapsed amount of time is on the order of minutes.

After non-initialized dispatcher 260 has obtained at least the set of base data and becomes an initialized dispatcher, now-initialized dispatcher 260 can send a notification to DS that initialization is complete. In some implementations, DS 152 can cause the initialized dispatcher to terminate the data retrieval. For example, DS 152 can send a termination command to now-initialized dispatcher 260, and now-initialized dispatcher 260 can terminate the data retrieval in response to receiving the termination command. DS 152 can update an initialization status of now-initialized dispatcher 260 from non-initialized to initialized. In turn, now-initialized dispatcher 260 can serve as an initialization partner for another non-initialized dispatcher of set of dispatchers 154.

Now-initialized dispatcher 260 can store dispatch decision data in memory (e.g., cache). Upon receiving a dispatch request, now-initialized dispatcher 260 can process the dispatch request using the dispatch decision data to make a dispatch decision. For example, the dispatch decision data can be stored in cache in order to quickly retrieve and process the dispatch decision data to make the dispatch decision.

In some implementations, at least one machine learning (ML) model is trained to manage dispatcher initialization. For example, an ML model can be used to predict, based on input data related to a state of system 100 and/or system 200, an optimal selection of an initialization partner from set of dispatchers 154. As another example, an ML model can be used to control, based on input data related to the state of system 100 and/or system 200, an amount of dispatch decision data retrieved from an initialization partner during a data retrieval process. As yet another example, an ML model can be used to control, based on input data related to a state of system 100 and/or system 200, an elapsed amount of time to perform the data retrieval process.

Figure 3:
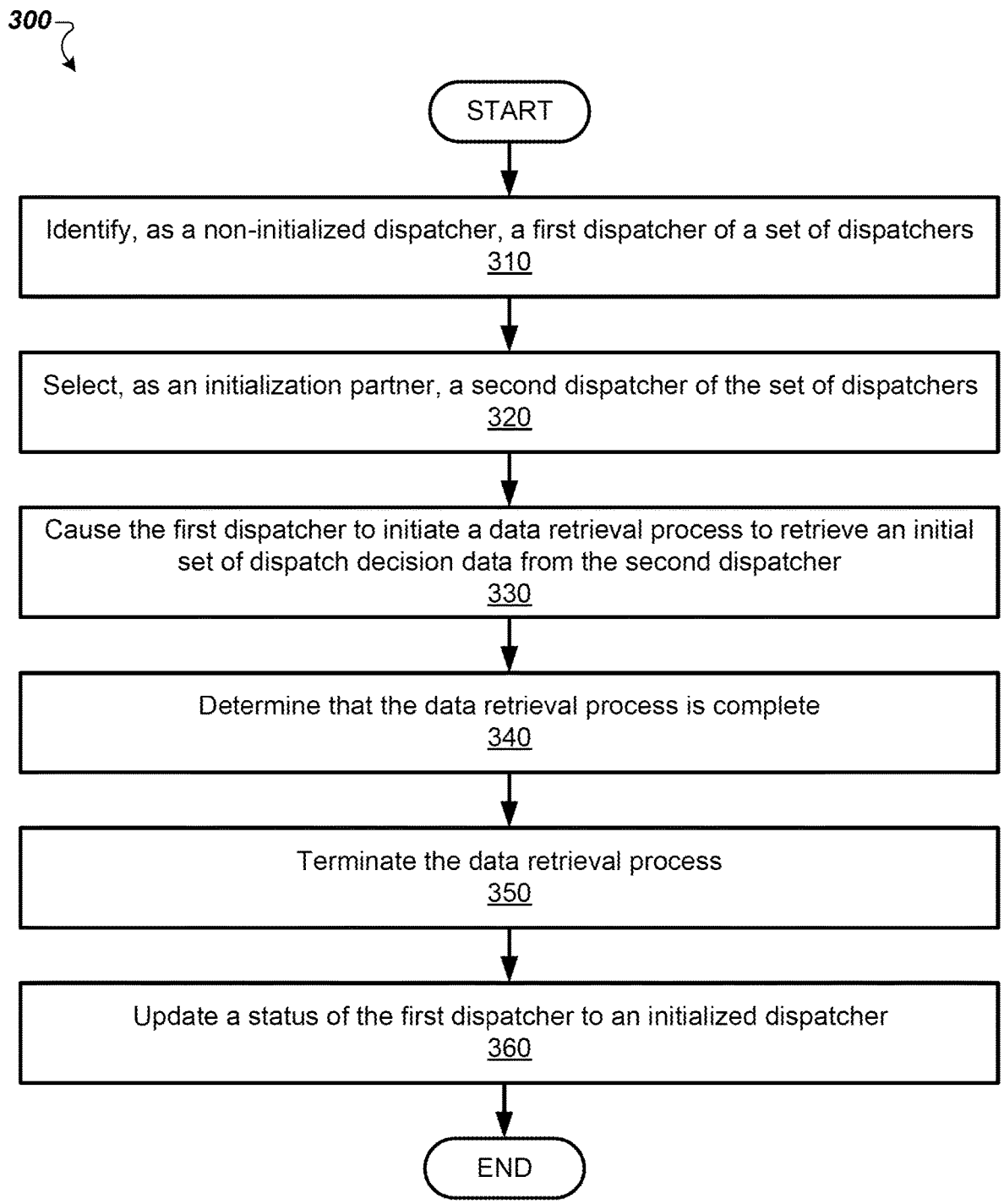
FIGS. 3-5 are flowcharts of example methods for initializing dispatchers of a dispatching system of a manufacturing facility, according to aspects of the present disclosure.

FIG. 3 is a flowchart of a method 300 for initializing a dispatcher of a dispatching system of a manufacturing facility, in accordance with some implementations of the present disclosure. Method 300 is performed by processing logic that can include hardware (circuitry, dedicated logic, etc.), software (such as is run on a general-purpose computer system or a dedicated machine), firmware, or some combination thereof. In some implementations, method 300 is performed by a dispatch server, such as dispatch server 152 of FIGS. 1-2. In some implementations, one or more operations of method 300 can be performed by one or more other components of an electronic device manufacturing system.

At operation 310, processing logic identifies, as a non-initialized dispatcher, a first dispatcher of a set of dispatchers. Each dispatcher of the set of dispatchers can be a software application that makes dispatch decisions for a manufacturing facility based on facility data related to the manufacturing facility. In some implementations, the manufacturing facility includes an electronic device manufacturing system. For example, a dispatch decision can relate to processing of at least one substrate using at least one processing tool of the electronic device manufacturing system. In some implementations, the first dispatcher is a new dispatcher of the set of dispatchers that needs to be initialized (e.g., primed). In some implementations, the first dispatcher is a dispatcher that has been restarted and needs to be re-initialized (e.g., re-primed).

At operation 320, processing logic selects, as an initialization partner, a second dispatcher of the set of dispatchers. The second dispatcher can be selected as an initialization partner using any suitable method. For example, selecting the second dispatcher as an initialization partner can include selecting an idle dispatcher of the set of dispatchers as the initialization partner. If the set of dispatchers includes multiple idle dispatchers, then selecting the second dispatcher as an initialization partner can include selecting, as the initialization partner, an idle dispatcher of the set of dispatchers that has been most recently updated (e.g., includes the most up-to-date dispatch decision data). Accordingly, the second dispatcher selected as an initialization partner can be a most recently updated idle dispatcher of the set of dispatchers.

At operation 330, processing logic causes the first dispatcher to initiate a data retrieval process to retrieve an initial set of dispatch decision data from the second dispatcher. The initial set of dispatch decision data can include an initial set of facility data. In some implementations, the initial set of dispatch decision data includes at least one of: import files from import cache, subscribed repository table columns, cached reports (e.g., cached rules), managed cache data, unmanaged cache data, etc. In some implementations, the initial set of facility data describes at least one of: a set of substrate processing tools of the manufacturing facility, substrate routes between substrate processing tools of the set of substrate processing tools, a set of process recipes, etc.

Causing the first dispatcher to initiate the data retrieval process can include sending a notification to the first dispatcher that causes the first dispatcher to initiate the data retrieval process. In some implementations, sending the notification to the first dispatcher includes using an API call. For example, the API call can be a REST or RESTful API call. The notification can include an identifier of the second dispatcher as the initialization partner. For example, the identifier of the second dispatcher can include an address of the second dispatcher. In some implementations, the identifier of the second dispatcher includes a host name and a port number of the second dispatcher. Processing logic can cause the second dispatcher to halt all other dispatch activity until after initialization of the first dispatcher has been completed.

In some embodiments, the initial set of dispatch decision data includes a set of base data that places the first dispatcher into a state that sufficiently minimizes the amount of dispatch decision data that needs to be transferred between a repository storing dispatch decision data and the first dispatcher. The set of base data can be updated over time by obtaining updated dispatch decision data from the repository during normal operation of the first dispatcher after initialization is complete.

In some implementations, retrieving the initial set of dispatch decision data from the second dispatcher includes determining whether a threshold condition related to the data retrieval has been satisfied, and terminating the data retrieval to obtain the set of base data in response to determining that the threshold condition has been satisfied. For example, determining whether the threshold condition has been satisfied can include determining whether an amount of dispatch decision data retrieved from the second dispatcher is greater than or equal to a threshold amount of dispatch decision data. Illustratively, the threshold amount of dispatch decision data can be defined as a percentage of a total amount of dispatch decision data. As another example, determining whether the threshold condition has been satisfied can include determining whether an elapsed amount of time of data retrieval is greater than or equal to a threshold amount of time. The threshold amount of time can serve as a proxy for the threshold amount of dispatch decision data. Illustratively, the threshold amount of time can be defined as an average amount of time that is needed to obtain the threshold amount of dispatch decision data during the data retrieval process. In some implementations, the elapsed amount of time is on the order of minutes.

At operation 340, processing logic determines that the data retrieval process is complete and, at operation 350, processing logic terminates the data retrieval process. In some implementations, terminating the data retrieval process includes causing the first dispatcher to terminate the data retrieval. For example, terminating the initialization process can include sending a termination command to the first dispatcher to terminate the data retrieval process.

At operation 360, processing logic updates a status of the first dispatcher to an initialized dispatcher. For example, a dispatch server can maintain a record of which dispatchers of the set of dispatchers are initialized dispatchers. By doing so, the dispatch server can select the first dispatcher to be a future initialization partner for a future non-initialized dispatcher.

In some implementations, at least one ML model is trained to manage dispatcher initialization. For example, an ML model can be used to predict, based on input data related to a state of the electronic device manufacturing system, an optimal selection of the second dispatcher as an initialization partner from the set of dispatchers. As another example, an ML model can be used to control, based on input data related to the state of electronic device manufacturing system, an amount of dispatch decision data retrieved from an initialization partner during a data retrieval process. As yet another example, an ML model can be used to control, based on input data related to a state of the electronic device manufacturing system, an elapsed amount of time to perform the data retrieval process. Further details regarding operations 310-360 are described above with reference to FIGS. 1-2 and will be described in further detail below with reference to FIGS. 4-5.

Figure 4:
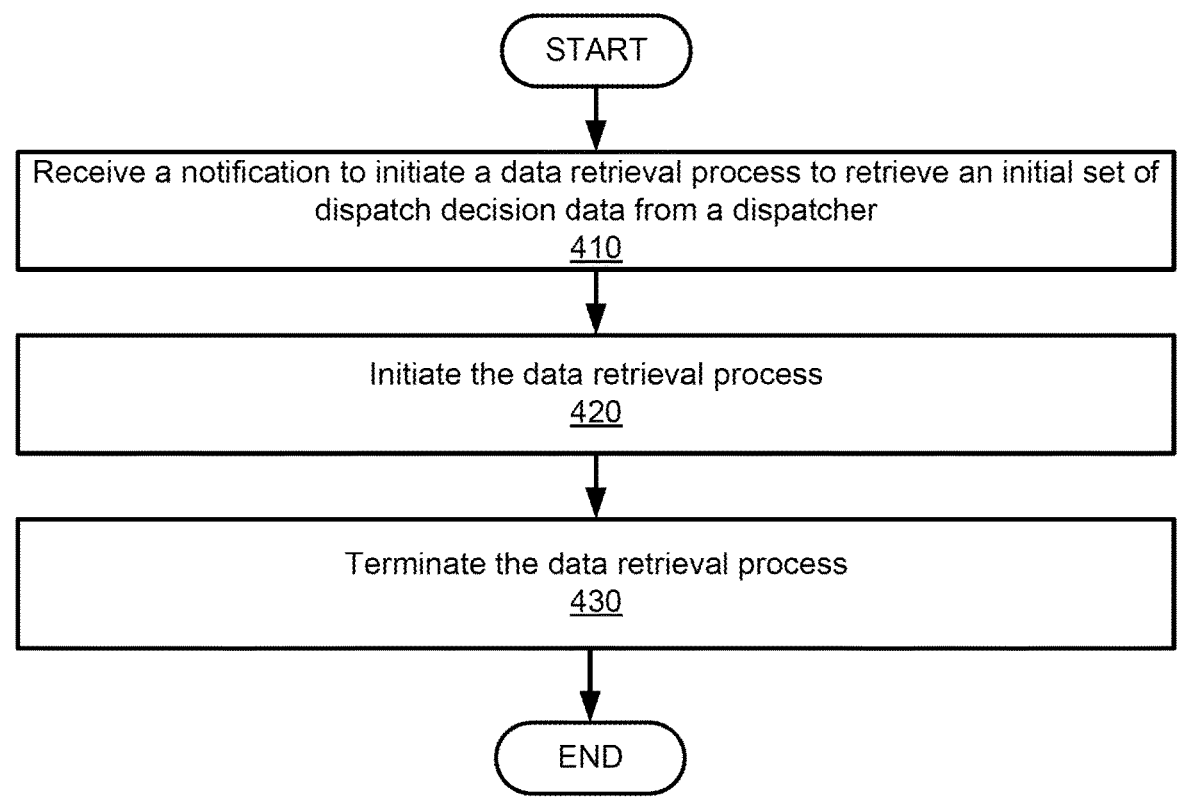

FIG. 4 is a flowchart of a method 400 for initializing a dispatcher of a dispatching system of a manufacturing facility, in accordance with some implementations of the present disclosure. Method 400 is performed by processing logic that can include hardware (circuitry, dedicated logic, etc.), software (such as is run on a general-purpose computer system or a dedicated machine), firmware, or some combination thereof. In some implementations, method 400 is performed by a non-initialized dispatcher, such as dispatcher 260 of FIG. 2. In some implementations, one or more operations of method 400 can be performed by one or more other components of an electronic device manufacturing system.

At operation 410, processing logic receives a notification to initiate a data retrieval process to retrieve an initial set of dispatch decision data from a dispatcher, and at operation 420, processing logic initiates the data retrieval process in response to receiving the notification. The dispatcher can be a software application that makes dispatch decisions for a manufacturing facility based on facility data related to the manufacturing facility. In some implementations, the manufacturing facility includes an electronic device manufacturing system. For example, a dispatch decision can relate to processing of at least one substrate using at least one processing tool of the electronic device manufacturing system.

More specifically, the notification can be received from a dispatcher server and the dispatcher can be an initialized dispatcher. In some implementations, the notification is received using an API call. For example, the API call can be a REST or RESTful API call. The notification can include an identifier of the dispatcher as an initialization partner. For example, the identifier of the dispatcher can include an address of the dispatcher. In some implementations, the identifier of dispatcher includes a host name and a port number of the dispatcher.

The initial set of dispatch decision data can include an initial set of facility data. In some implementations, the initial set of dispatch decision data includes at least one of: import files from import cache, subscribed repository table columns, cached reports (e.g., cached rules), managed cache data, unmanaged cache data, etc. In some implementations, the initial set of facility data describes at least one of: a set of substrate processing tools of the manufacturing facility, substrate routes between substrate processing tools of the set of substrate processing tools, a set of process recipes, etc.

At operation 430, processing logic terminates the data retrieval process. In some embodiments, the initial set of dispatch decision data retrieved from the dispatcher includes a set of base data that places a non-initialized dispatcher into a state that sufficiently minimizes the amount of dispatch decision data that needs to be transferred between a repository storing dispatch decision data and the non-initialized dispatcher. The set of base data can be updated over time by obtaining updated dispatch decision data from the repository during normal operation of the non-initialized dispatcher after initialization is complete.

In some implementations, retrieving the dispatch decision data from the dispatcher includes determining whether a threshold condition related to the data retrieval has been satisfied, and terminating the data retrieval to obtain the set of base data in response to determining that the threshold condition has been satisfied. For example, determining whether the threshold condition has been satisfied can include determining whether an amount of dispatch decision data retrieved from the dispatcher is greater than or equal to a threshold amount of dispatch decision data. Illustratively, the threshold amount of dispatch decision data can be defined as a percentage of a total amount of dispatch decision data. As another example, determining whether the threshold condition has been satisfied can include determining whether an elapsed amount of time of data retrieval is greater than or equal to a threshold amount of time. The threshold amount of time can serve as a proxy for the threshold amount of dispatch decision data. Illustratively, the threshold amount of time can be defined as an average amount of time that is needed to obtain the threshold amount of dispatch decision data during the data retrieval process. Further details regarding operations 410-430 are described above with reference to FIGS. 1-3 and will be described in further detail below with reference to FIG. 5.

Figure 5:
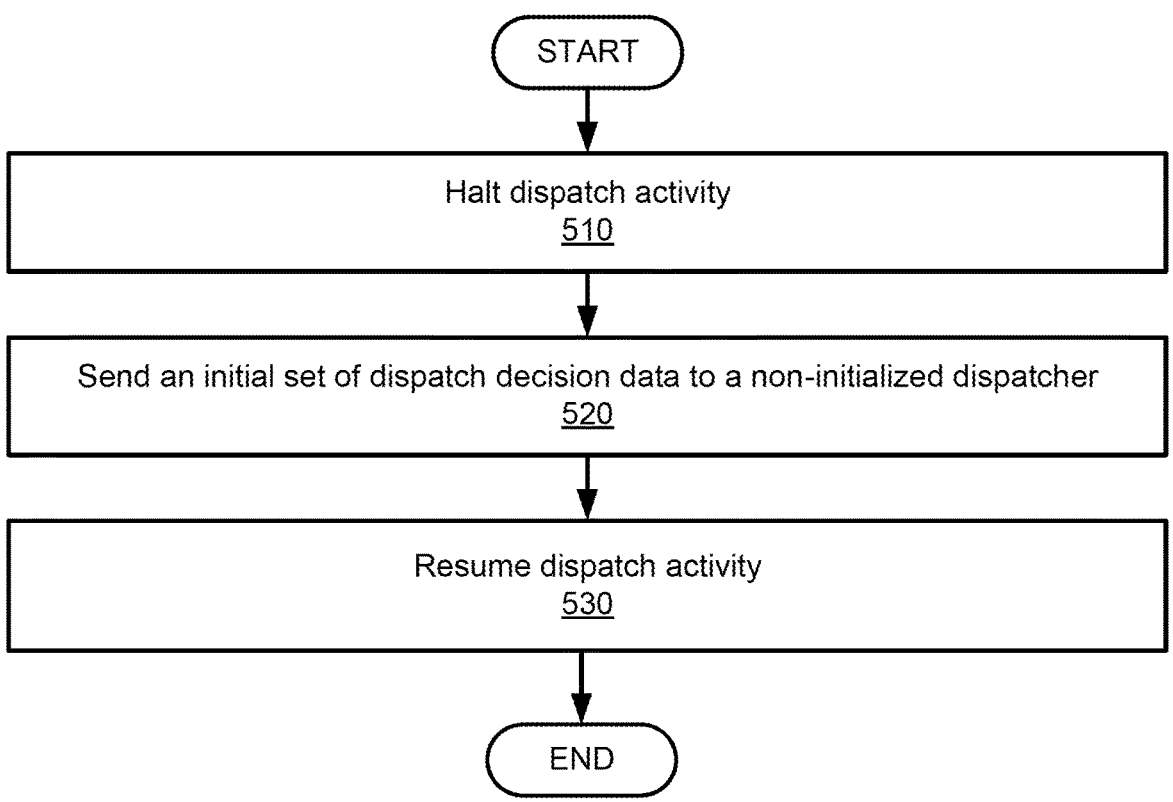

FIG. 5 is a flowchart of a method 500 for initializing a dispatcher of a dispatching system of a manufacturing facility, in accordance with some implementations of the present disclosure. Method 500 is performed by processing logic that can include hardware (circuitry, dedicated logic, etc.), software (such as is run on a general-purpose computer system or a dedicated machine), firmware, or some combination thereof. In some implementations, method 500 is performed by a dispatcher selected as an initialization partner, such as dispatcher 262 of FIG. 2.

In some implementations, one or more operations of method 500 can be performed by one or more other components of an electronic device manufacturing system.

At operation 510, processing logic halts dispatch activity. For example, a dispatch server can cause the dispatch activity to be halted.

At operation 520, processing logic sends an initial set of dispatch decision data to a non-initialized dispatcher. More specifically, the initial set of dispatch decision data can be sent to the non-initialized dispatcher during a data retrieval process to initialize the non-initialized dispatcher. The initial set of dispatch decision data can include an initial set of facility data. In some implementations, the initial set of dispatch decision data includes at least one of: import files from import cache, subscribed repository table columns, cached reports (e.g., cached rules), managed cache data, unmanaged cache data, etc. In some implementations, the initial set of facility data describes at least one of: a set of substrate processing tools of the manufacturing facility, substrate routes between substrate processing tools of the set of substrate processing tools, a set of process recipes, etc.

At operation 530, processing logic resumes dispatch activity. For example, the dispatch server can cause the dispatch activity to be resumed after completion of the data retrieval process. Further details regarding operations 510-530 are described above with reference to FIGS. 1-4.

Figure 6:
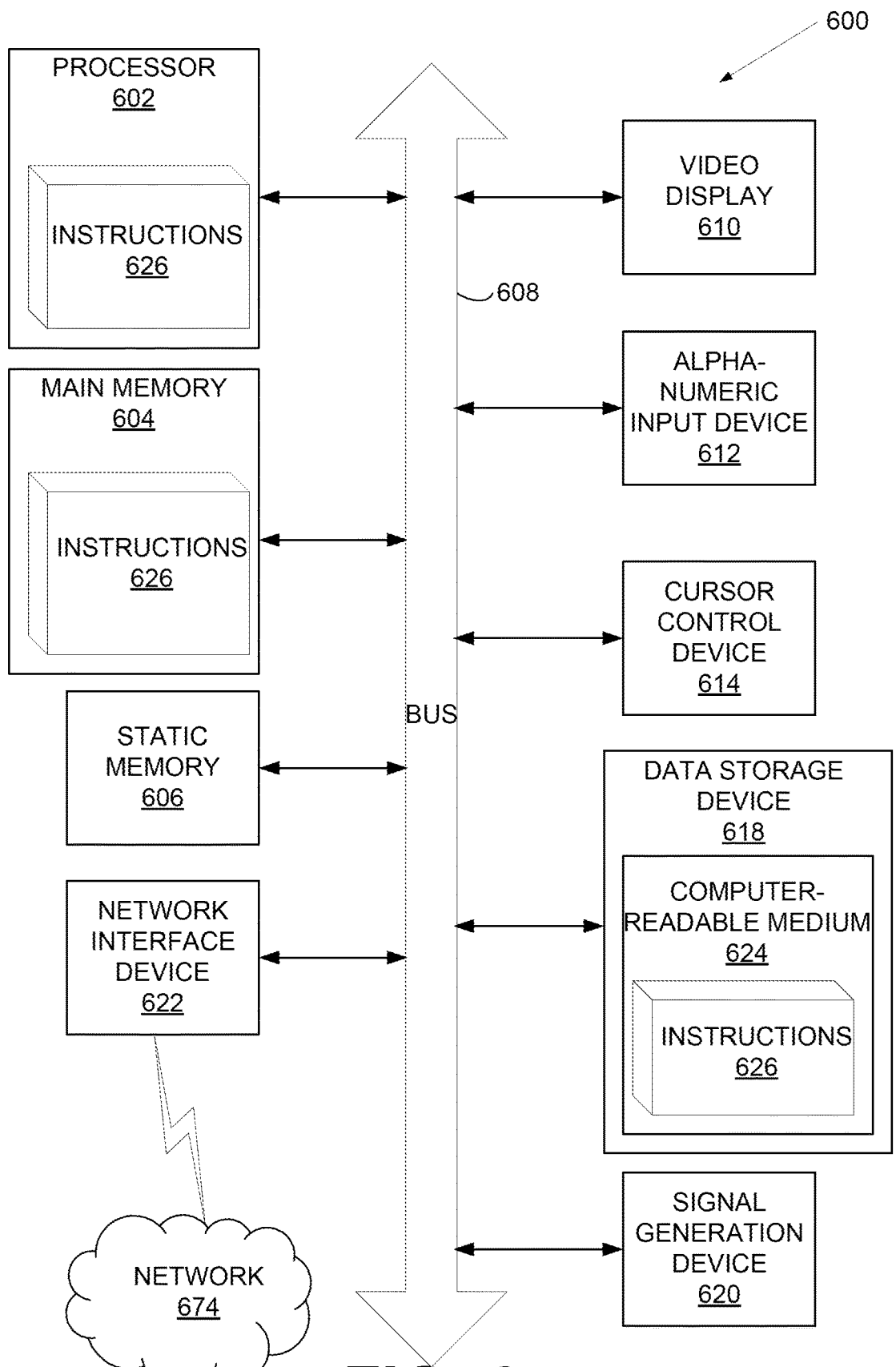
FIG. 6 is a block diagram illustrating a computer system, according to certain implementations.

FIG. 6 is a block diagram illustrating a computer system 600, according to certain implementations. In some implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 600 can include processing device 602, volatile memory 604 (e.g., random-access memory (RAM)), non-volatile memory 606 (e.g., read-only memory (ROM) or electrically-erasable programmable ROM (EEPROM)), and data storage device 616, which can communicate with each other via bus 608.

Processing device 602 can be provided by one or more processors such as a general purpose processor (such as, for example, a complex instruction set computing (CISC) microprocessor, a reduced instruction set computing (RISC) microprocessor, a very-long instruction word (VLIW) microprocessor, a microprocessor implementing other types of instruction sets, or a microprocessor implementing a combination of types of instruction sets) or a specialized processor (such as, for example, an application-specific integrated circuit (ASIC), a field-programmable gate array (FPGA), a digital signal processor (DSP), or a network processor).

Computer system 600 can further include network interface device 622 (e.g., coupled to network 674). Computer system 600 also can include video display unit 610 (e.g., an LCD), alphanumeric input device 612 (e.g., a keyboard), cursor control device 614 (e.g., a mouse), and signal generation device 620.

In some implementations, data storage device 616 can include non-transitory computer- readable storage medium 624 on which can store instructions 626 encoding any one or more of the methods or functions described herein, including methods or functions implemented by dispatch server 152 and/or dispatcher 260.

Instructions 626 can also reside, completely or partially, within volatile memory 604 and/or within processing device 602 during execution thereof by computer system 600, hence, volatile memory 604 and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "accessing," "determining," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method of operating a set of dispatchers for a manufacturing facility, wherein each dispatcher of the set of dispatchers is a software application that makes dispatch decisions for the manufacturing facility based on facility data related to the manufacturing facility, the method comprising:
   identifying a first dispatcher of the set of dispatchers, wherein the first dispatcher is a non-initialized dispatcher;
   selecting, as an initialization partner, a second dispatcher of the set of dispatchers, wherein selecting the second dispatcher comprises identifying a most recently updated idle dispatcher of the set of dispatchers;
   causing the first dispatcher to initiate a data retrieval process with the second dispatcher to retrieve, from the second dispatcher, an initial set of facility data related to the manufacturing facility; and
   using, based on the initial set of facility data, the first dispatcher to cause a substrate to be dispatched to a substrate processing tool for processing.

2. The method of claim 1, wherein the first dispatcher is one of: a new dispatcher of the set of dispatchers, or a dispatcher that has been restarted.

3. The method of claim 1, wherein causing the first dispatcher to initiate the initialization process with the second dispatcher comprises sending, to the first dispatcher, a notification comprising an identifier of the second dispatcher as the initialization partner, and wherein the identifier comprises a host name and a port number of the second dispatcher.

4. The method of claim 1, wherein the initial set of facility data comprises at least one of: import files from import cache, subscribed repository table columns, cached reports, managed cache data, or unmanaged cache data.

5. The method of claim 1, wherein the initial set of facility data describes at least one of: a set of substrate processing tools of the manufacturing facility, substrate routes between substrate processing tools of the set of substrate processing tools, or a set of process recipes.

6. The method of claim 1, further comprising:
   determining that the data retrieval process is complete;
   responsive to determining that the data retrieval process is complete, terminating the data retrieval process; and
   updating a status of the first dispatcher to an initialized dispatcher.

7. The method of claim 1, further comprising:
   initiating the first dispatcher using the initial set of facility data to obtain an initialized first dispatcher; and
   after initiating the first dispatcher using the initial set of facility data, using the initiated first dispatcher to cause the substrate to be dispatched to the substrate processing tool for processing.

8. The method of claim 1, further comprising:
   receiving, by the first dispatcher from a dispatch server, a notification to initiate the data retrieval process;
   initiating, by the first dispatcher, the data retrieval process to retrieve the initial set of facility data from the second dispatcher;
   determining that the data retrieval process is complete; and
   responsive to determining that the data retrieval process is complete, terminating the data retrieval process.

9. The method of claim 8, wherein determining that the data retrieval process is complete comprises determining whether a threshold condition related to the data retrieval has been satisfied.

10. The method of claim 9, wherein determining that the threshold condition has been satisfied comprises determining that an amount of facility data retrieved from the second dispatcher is greater than or equal to a threshold amount of data.

11. A system for operating a set of dispatchers for a manufacturing facility, wherein each dispatcher of the set of dispatchers is a software application that makes dispatch decisions for the manufacturing facility based on facility data related to the manufacturing facility, the system comprising:
- a memory; and
- at least one processing device, operatively coupled to the memory, to perform operations comprising:
  - identifying a first dispatcher of the set of dispatchers, wherein the first dispatcher is a non-initialized dispatcher;
  - selecting, as an initialization partner, a second dispatcher of the set of dispatchers, wherein selecting the second dispatcher comprises identifying a most recently updated idle dispatcher of the set of dispatchers;
  - causing the first dispatcher to initiate a data retrieval process with the second dispatcher to retrieve, from the second dispatcher, an initial set of facility data related to the manufacturing facility; and
  - using, based on the initial set of facility data, the first dispatcher to cause a substrate to be dispatched to a substrate processing tool for processing.

12. The system of claim 11, wherein the first dispatcher is one of: a new dispatcher of the set of dispatchers, or a dispatcher that has been restarted.

13. The system of claim 11, wherein causing the first dispatcher to initiate the initialization process with the second dispatcher comprises sending, to the first dispatcher, a notification comprising an identifier of the second dispatcher as the initialization partner, and wherein the identifier comprises a host name and a port number of the second dispatcher.

14. The system of claim 11, wherein the initial set of facility data comprises at least one of: import files from import cache, subscribed repository table columns, cached reports, managed cache data, or unmanaged cache data.

15. The system of claim 11, wherein the initial set of facility data at least describes at least one of: a set of substrate processing tools of the manufacturing facility, substrate routes between substrate processing tools of the set of substrate processing tools, or a set of process recipes.

16. The system of claim 11, wherein the operations further comprise:
- determining that the data retrieval process is complete;
- responsive to determining that the data retrieval process is complete, terminating the data retrieval process; and
- updating a status of the first dispatcher to an initialized dispatcher.

17. The system of claim 11, wherein the operations further comprise:
- initiating the first dispatcher using the initial set of facility data to obtain an initialized first dispatcher; and
- after initiating the first dispatcher using the initial set of facility data, using the initiated first dispatcher to cause the substrate to be dispatched to the substrate processing tool for processing.

18. The system of claim 11, wherein the operations further comprise:
- receiving, by the first dispatcher from a dispatch server, a notification to initiate the data retrieval process;
- initiating, by the first dispatcher, the data retrieval process to retrieve the initial set of facility data from the second dispatcher;
- determining that the data retrieval process is complete, wherein determining that the data retrieval process is complete comprises determining whether a threshold condition related to the data retrieval has been satisfied; and
- responsive to determining that the data retrieval process is complete, terminating the data retrieval process.

* * * * *